(12) United States Patent
Yamagata et al.

(10) Patent No.: US 6,272,282 B1
(45) Date of Patent: Aug. 7, 2001

(54) RECORDING/REPRODUCING APPARATUS HAVING MEANS FOR REPRODUCING SIGNALS FROM A RECORDING BLOCK RECORDED IMMEDIATELY BEFORE

(75) Inventors: Shigeo Yamagata, Yokohama; Yuji Sakaegi, Kawasaki, both of (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 08/188,739

(22) Filed: Jan. 31, 1994

Related U.S. Application Data

(63) Continuation of application No. 07/552,807, filed on Jul. 16, 1990, now abandoned.

(30) Foreign Application Priority Data

Jul. 20, 1989 (JP) .................................................. 1-185983
Jul. 20, 1989 (JP) .................................................. 1-185985

(51) Int. Cl.[7] .................................................. H04N 5/91
(52) U.S. Cl. .................................. 386/78; 386/82; 386/121
(58) Field of Search .................................. 360/35.1, 72.1, 360/78.08, 78.04; 358/906, 909; 369/53.37, 53.31; 386/68, 77, 78, 95, 117, 120, 121, 70, 82

(56) References Cited

U.S. PATENT DOCUMENTS

| 4,792,863 | * | 12/1988 | Urabe | 358/909 |
| 4,951,276 | * | 8/1990 | Sakaegi et al. | 360/72.1 |
| 4,982,291 | * | 1/1991 | Kurahashi et al. | 358/335 |
| 5,053,898 | * | 10/1991 | Hashimoto et al. | 360/72.1 |
| 5,086,345 | | 2/1992 | Nakane et al. | 386/118 |

FOREIGN PATENT DOCUMENTS

| 2087100 | * | 5/1982 | (GB) | 360/72.1 |
| 01256877 | * | 1/1989 | (JP) | |
| 01256878 | * | 1/1989 | (JP) | |

\* cited by examiner

Primary Examiner—Andrew L. Sniezek
(74) Attorney, Agent, or Firm—Fitzpatrick, Cella, Harper & Scinto

(57) ABSTRACT

A recording and reproducing apparatus includes a memory unit for memorizing information to identify a recording block that was recorded immediately before, and a control unit for referring to the memory unit (upon switching from a recording mode to a reproducing mode) to reproduce a signal from the recording block that was recorded immediately before.

6 Claims, 14 Drawing Sheets

| | (1) ○ | (2) ○ | (3) ○ | (4) ○ | (5) ○ | (6) ○ | (7) ○ | (8) ○ |
|---|---|---|---|---|---|---|---|---|
| a | | | | | | | | |
| b | (9) ○ | (10) ○ | (11) ○ | (12) ○ | (13) ○ | (14) ○ | (15) ○ | (16) ○ |
| c | (17) ○ | (18) ○ | (19) ○ | (20) ○ | (21) ○ | (22) ○ | (23) ○ | (24) ○ |
| d | (25) ○ | (26) ○ | (27) ○ | (28) ○ | (29) ○ | (30) ○ | (31) ○ | (32) ○ |
| e | (33) ○ | (34) ○ | (35) ○ | (36) ○ | (37) ○ | (38) ○ | (39) ○ | (40) ○ |
| f | (41) ○ | (42) ○ | (43) ○ | (44) ○ | (45) ○ | (46) ○ | (47) ○ | (48) ○ |
| g | (49) ○ | (50) ○ | | | | | | |

LSB          MSB

F I G. 3

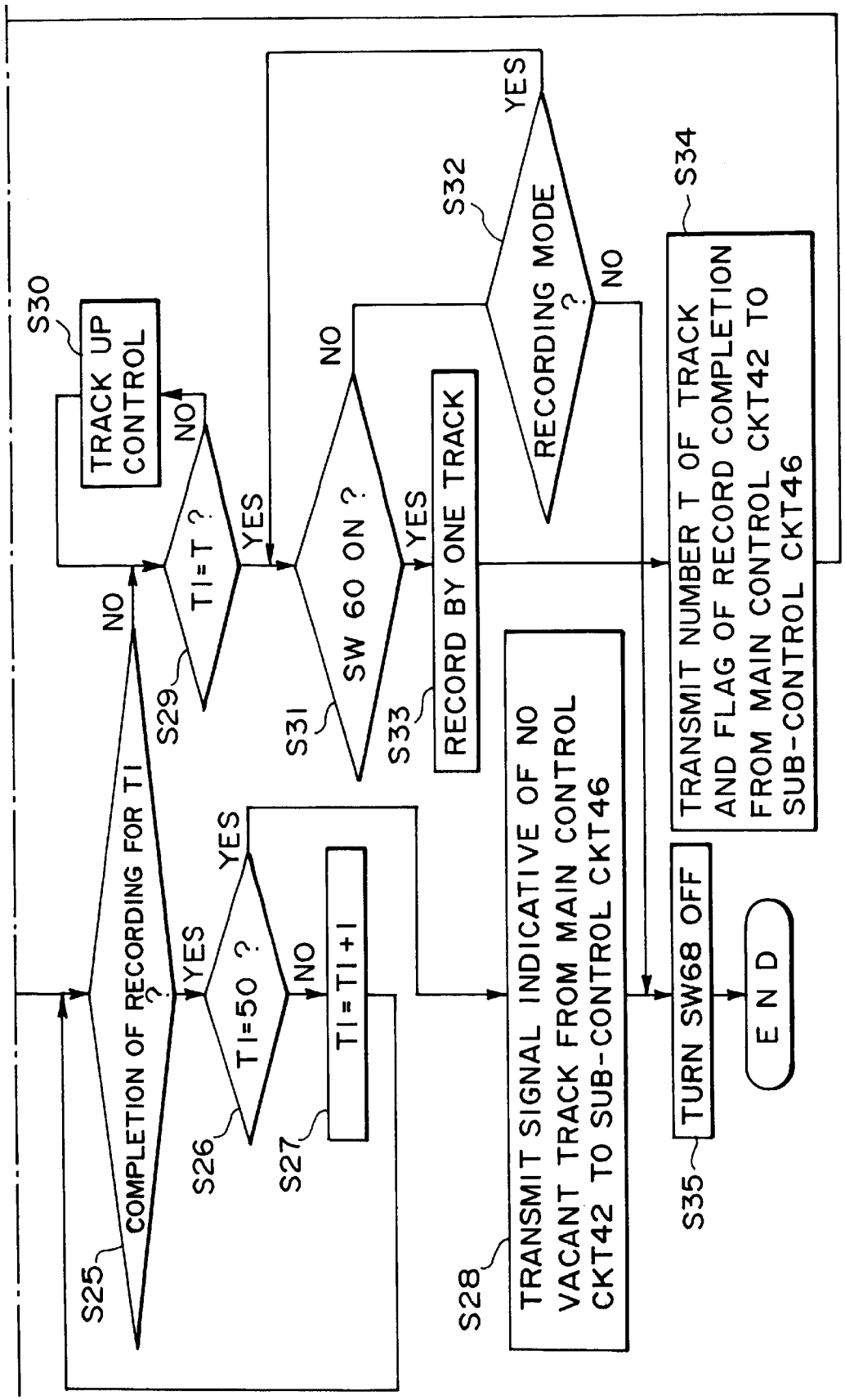
F I G. 4B

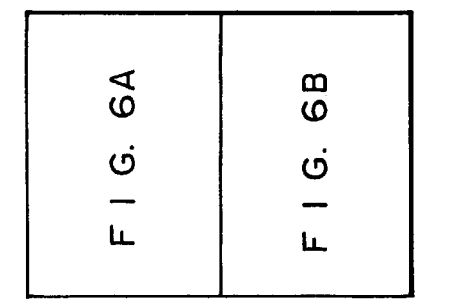
FIG. 6
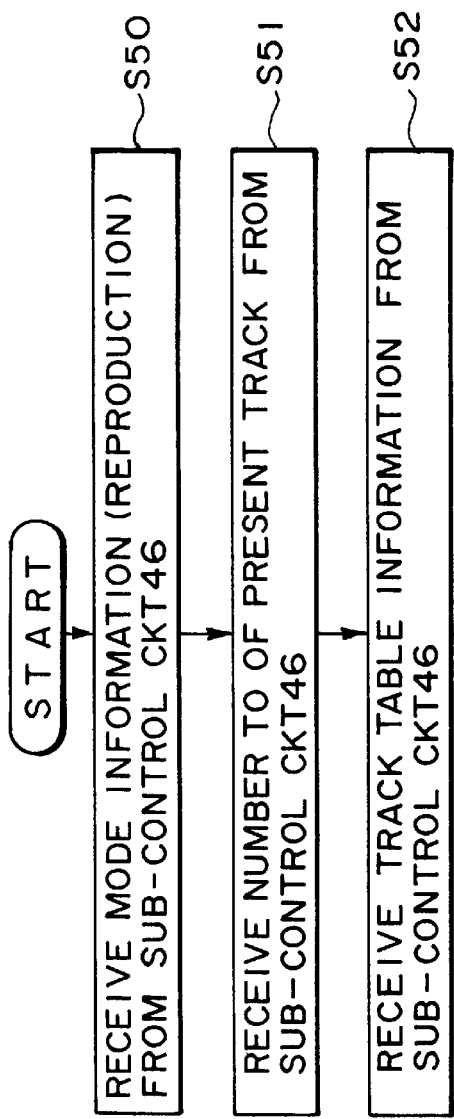
FIG. 6A
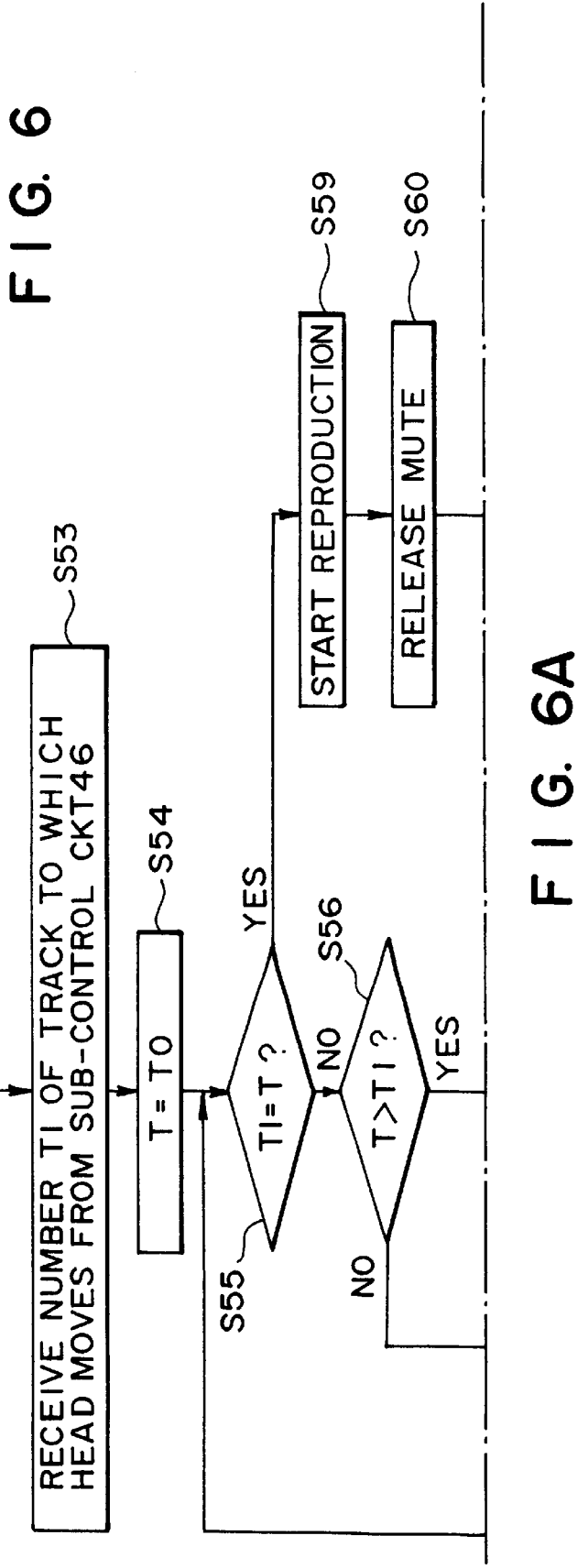

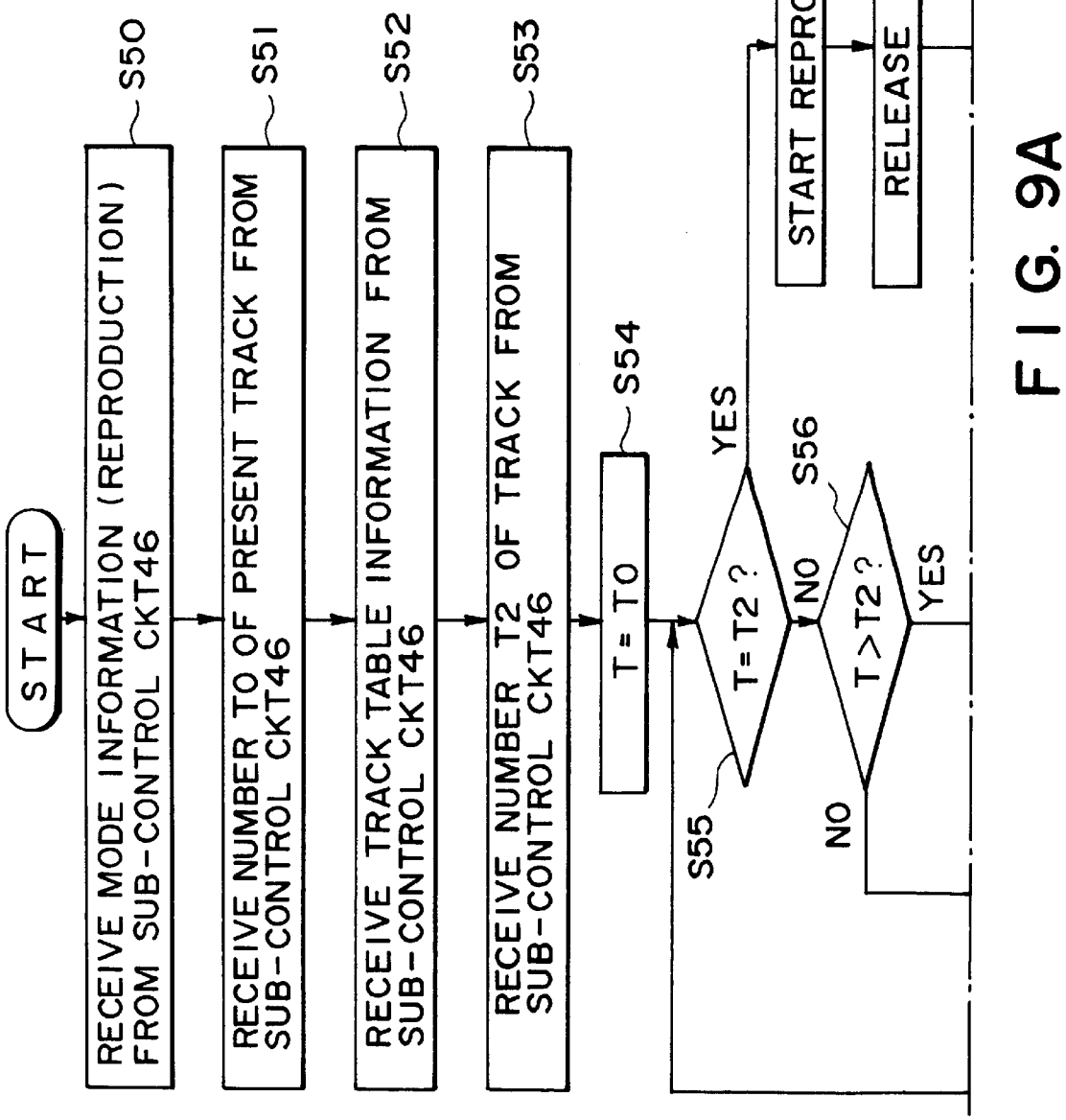

RECORDING/REPRODUCING APPARATUS HAVING MEANS FOR REPRODUCING SIGNALS FROM A RECORDING BLOCK RECORDED IMMEDIATELY BEFORE

This application is a continuation of application Ser. No. 07/552,807 filed Jul. 16, 1990, now abandoned.

BACKGROUND OF THE INVENTION

1. Field of the Invention

The present invention relates to a recording or reproducing apparatus for an image recording medium.

2. Description of the Related Art

A format for recording an image signal of a field on each of 50 concentric tracks formed on a magnetic disk has been agreed on by the Still Video Committee, and the agreed upon format is commonly used as the image recording medium for electronic still cameras or the like.

In electronic still cameras, in order to avoid double recording of the image signal, the recorded/unrecorded states of the tracks of the magnetic disk are searched in advance, and the result of the search is stored as a table in an internal memory and is referred to at the subsequent recording or reproduction. Also, in order to enable immediate recording of the image on the magnetic disk, at the start of power supply or at the loading of the magnetic disk, the presence or absence of a RF reproduction signal is detected in succession from the innermost 50th track toward the outer tracks, and the magnetic head waits on a track immediately inside the first recorded track found.

In the still video floppy disk, the empty tracks may be present in a scattered manner, because the recorded image may have been erased. Consequently, empty tracks may be present outside the empty track on which the magnetic head was positioned by the search operation at the loading of the magnetic disk. Conventionally, in the table indicating the recorded/unrecorded state of each track (hereinafter called track table), each track is given a 2-bit flag, which is set as "11" for a confirmed recorded track, "01" for a confirmed unrecorded track, or "00" for an unconfirmed track.

Thus, at the loading of the magnetic disk or immediately after the start of power supply, the flags of said track table are initialized to "00". In the initial positioning operation of the magnetic head, the first recorded track found in the search from the inside is given a flag "11", while the inner tracks are given flags "01", and the outer tracks are given "00" because they have not yet been searched.

In the interval reproduction mode in which the recorded tracks only are reproduced in succession at a predetermined interval, access is not made to the tracks having a flag "01" in the track table, but is made to the tracks having "00" to check the recorded/unrecorded state by the RF reproduction signal. If the track is recorded, the recorded signal is reproduced and the corresponding flag is changed to "11". If the track is unrecorded, reproduction is not conducted and the flag is changed to "01". The recorded tracks are reproduced in succession in this manner by checking of the recorded/unrecorded state.

However, in such a conventional structure using 2 bits for each track, a memory area as large as 100 bits is required for 50 tracks. Such a memory area is often formed in a RAM integrated in a one-chip microcomputer, but such track information should preferably be as small as possible, because the entire memory capacity is limited.

Also in a electronic still camera with a conventional reproducing function, the outer-most track of the still video floppy disk is reproduced automatically when the operating mode is switched from recording to reproduction.

In such a structure, however, in case of observing the recorded image immediately after the image has been recorded on the floppy disk in the recording mode, cumbersome operations are required including first switching the recording mode to the reproduction mode thereby setting the magnetic head on the first track, and then returning the magnetic head to the track recorded immediately before by means of manual manipulation of up- and down-switches.

SUMMARY OF THE INVENTION

An object of the present invention is to provide a recording or reproducing apparatus capable of individually or entirely resolving the above-mentioned drawbacks.

Another object of the present invention is to provide a reproducing apparatus capable of controlling the recording areas on the recording medium with a reduced memory capacity.

The foregoing objects can be attained, according to a preferred embodiment of the present invention, by a reproducing apparatus for a recording medium having plural areas for signal recording, comprising detection means for detecting the recorded/unrecorded state of each of the plural areas; first memory means having a memory area for memorizing a recorded or unrecorded state of each of the plural areas; and second memory means for memorizing the result of confirmation of the recorded/unrecorded state by the detection means, the information indicating the range of areas memorized in the first memory means, whereby the first memory means is not required to store the information indicating that the recorded/unrecorded state is not yet confirmed and can therefore be reduced in the memory capacity.

Still another object of the present invention is to provide a record reproducing apparatus capable of rapidly reproducing serially recorded images.

Still another object of the present invention is to provide a reproducing apparatus capable of reproducing an image recorded immediately before by means of a simple operation.

Still another object of the present invention is to provide a recording or reproducing apparatus having novel functions.

Still other objects of the present invention and the advantages thereof will become fully apparent from the following description of the preferred embodiments, to be taken in conjunction with the attached drawings.

BRIEF DESCRIPTION OF THE DRAWINGS

FIG. 3 is a memory map of a track information table in an embodiment of the present invention;

FIGS. 4, 4A, 4B are flow charts of a recording sequence;

FIGS. 6, 6A, 6B are flow charts of a reproducing sequence;

FIGS. 8, 8A, 8B are flow charts of an interval reproduction sequence; and

FIGS. 9, 9A, 9B are flow charts showing a variation of the sequence shown in FIG. 6.

DETAILED DESCRIPTION OF THE PREFERRED EMBODIMENTS

Now the present invention will be clarified in detail by preferred embodiments thereof shown in the attached drawings.

Figure 1:
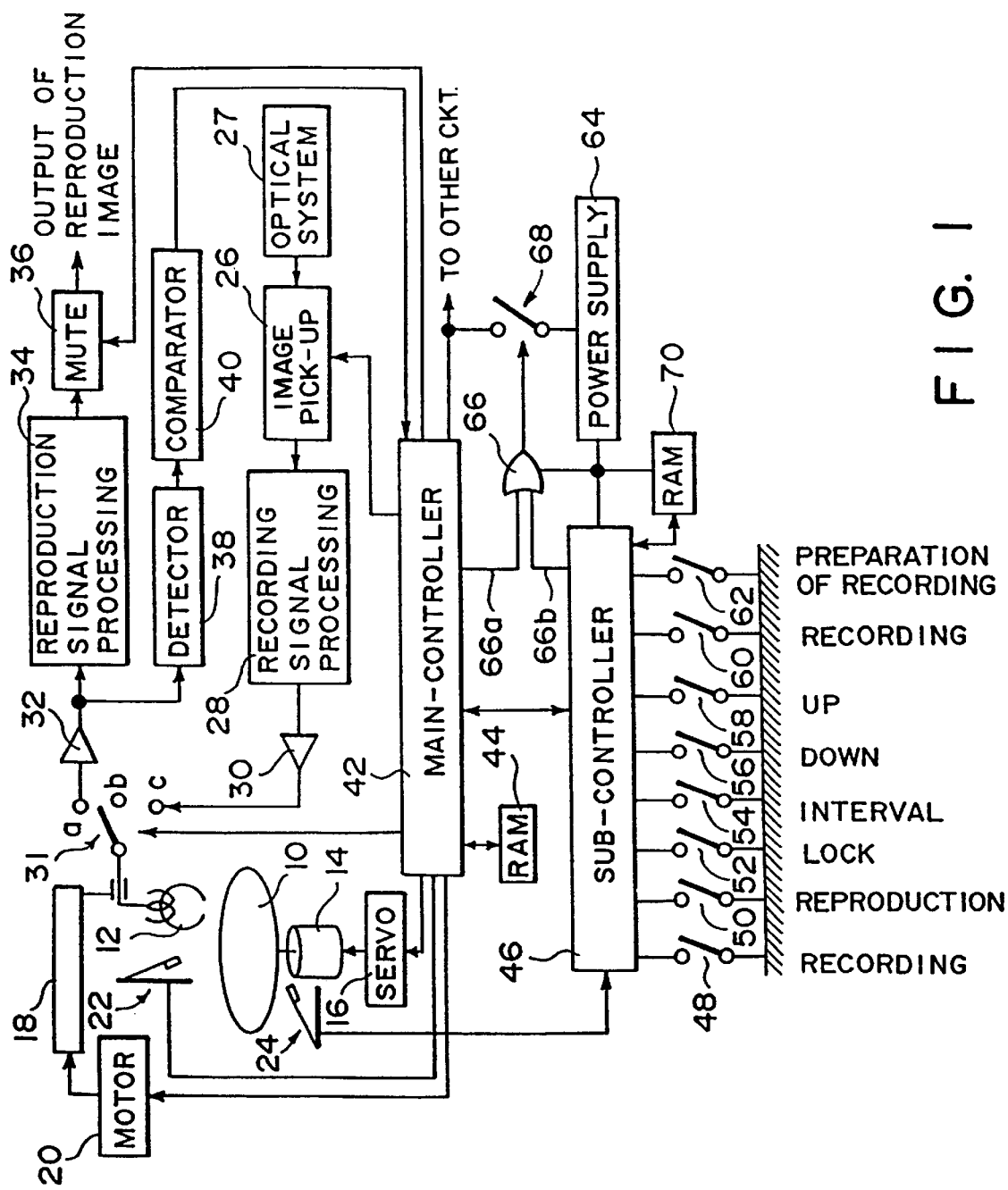
FIG. 1 is a block diagram of an embodiment of the present invention.

FIG. 1 is a block diagram of an embodiment of the present invention, applied to an electronic still camera. There are shown a magnetic disk 10 having 50 tracks numbered from 1 to 50 from the outside; a record/reproducing magnetic head 12; a motor 14 for rotating the magnetic disk 10; a servo circuit 16 for maintaining the revolution of the motor 14 at a predetermined value; a head moving mechanism 18 for moving the magnetic head 12 in the radial direction of the magnetic disk 10 to a designated track position; a stepping motor 20 for powering the head moving mechanism 18; an innermost track detection switch 22 to be closed when the magnetic head 12 is positioned on the innermost track; and a disk detection switch 24 for detecting the loading of the magnetic disk 10.

There are further provided an image pickup circuit 26 for converting an optical image formed by an optical system 27 into an electrical signal; a recording signal processing circuit 28 for applying signal processing such as gamma correction or frequency modulation to the output signal of the image pickup circuit 26 thereby converting it into a signal suitable for recording on the magnetic disk 10; a recording amplifier 30; a selector switch 31 having a contact "a" for reproduction, a contact "c" for recording and an unconnected-contact "b"; a reproducing amplifier 32; a reproduction signal processing circuit 34 for applying signal processing such as FM demodulation to the output of the reproducing amplifier 32 thereby obtaining an image signal; a muting circuit 36 for muting the output of the processing circuit 34 in response to an external control signal; a detection circuit 38 for envelope detection of the output of the reproducing amplifier 32; and a comparator circuit 40 for comparing the output voltage of the detection circuit 38 with a predetermined reference voltage.

There are further provided a main control circuit 42 for controlling the above-mentioned various units; a memory 44 for storing various data and variables required for the main control circuit 42; a sub-control circuit 46 for monitoring switch inputs to be explained later and effecting bidirectional handshake communication with the main control circuit 42; mode setting switches 48, 50, 52 for respectively setting recording, reproducing or lock mode; a switch 54 for starting interval reproduction; a switch 56 for track downshift; a switch 58 for track upshift; a switch 60 for executing the recording operation; and a switch 62 for instructing the preparation for the recording operation.

The mode setting switches 48, 50, 52 are constructed so that only one thereof can be closed at a time and two thereof cannot be closed at the same time. The sub-control circuit 46 transmits the closing of the switch 54, 56 or 58 to the main control circuit 42 at the time of such closing.

There are further shown a power supply unit 64; an OR gate 66 for controlling a switch 68 in response to a control signal from the sub-control circuit 46 or the main control circuit 42; and a memory 70 for storing data required for the sub-control circuit 46. The sub-control circuit 46, OR gate 66 and memory 70 are constantly powered by the power supply unit 64, while the main control unit 42 and other units are powered through the switch 68, which is closed or opened respectively when the OR gate 66 provides a high (H) or low (L) output. The sub-control circuit 46 shifts a signal 66b to the H-level when the loaded state of the magnetic disk 10 is detected in the recording or reproducing mode, when the operating mode is switched from recording to reproduction or from reproduction to recording, when the reproduction mode is set by the mode setting switch 50, or when the recording switch 60 or the recording preparation switch 62 is closed in the recording mode. At the start of power supply, the main control circuit 42 shifts a signal 66a to the H-level for communication with the sub-control circuit 46, which shifts the signal 66b to the H-level during the communication.

Figure 2:
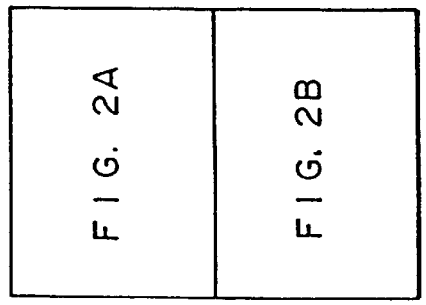
FIGS. 2, 2A and 2B are a flow charts of an initializing sequence.
Figure 2A:
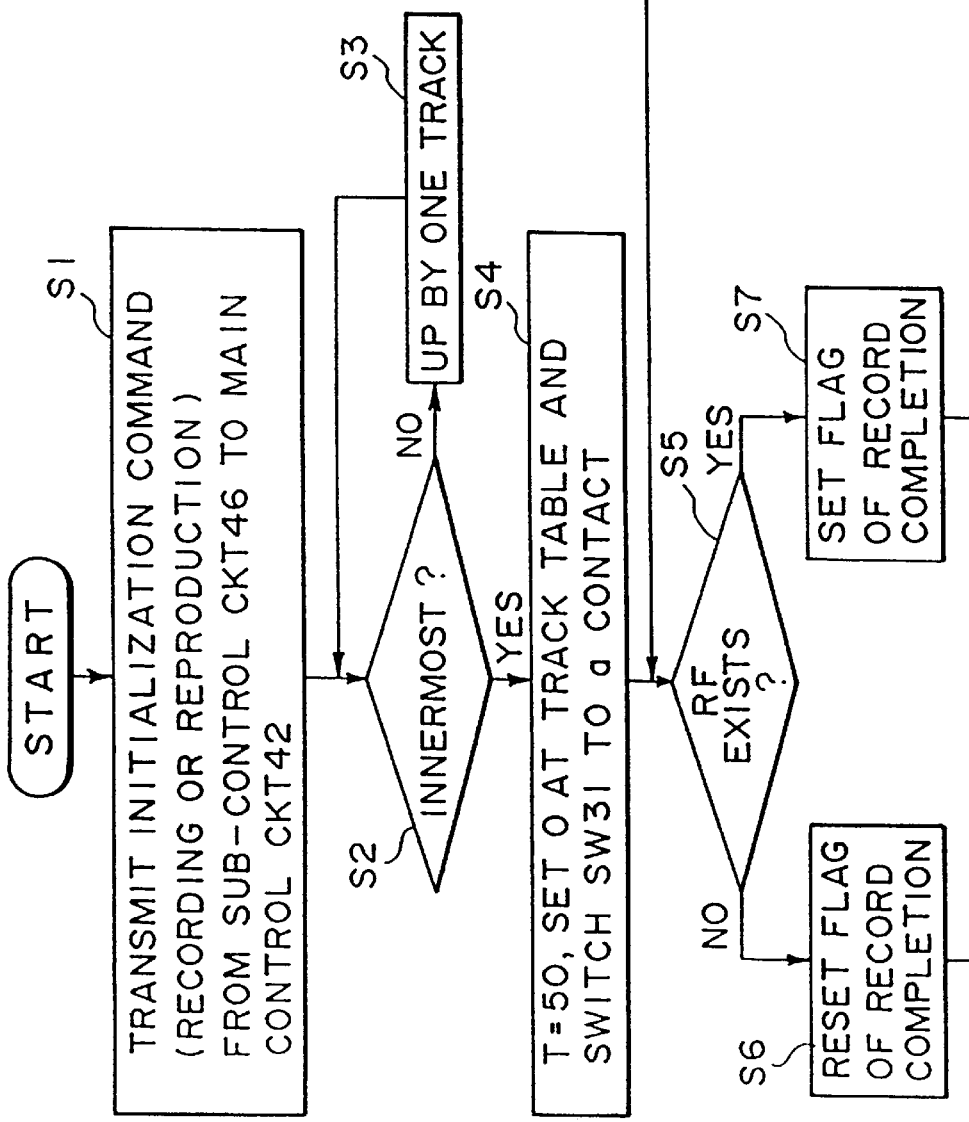
Figure 2B:
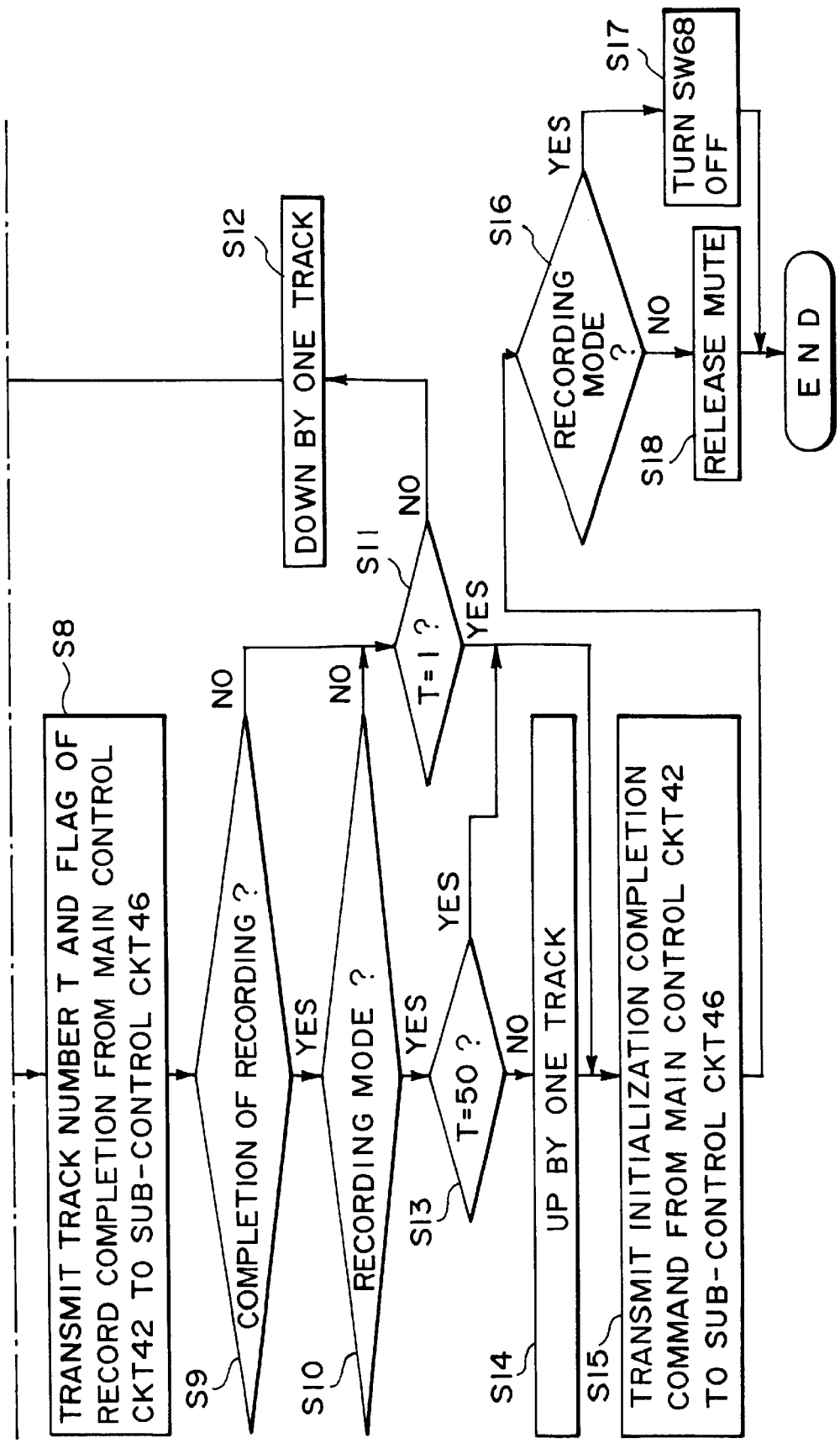

Now reference is made to FIG. 2 for explaining the sequence at the loading of the magnetic disk 10. The sub-control circuit 46 is constantly powered by the power supply unit 64, and detects the loading of the magnetic disk 10 by the disk detecting switch 24. In response to a detection, the sub-control circuit 46 investigates the state of the mode setting switches 48, 50, 52, and, if the locking mode is not set, closes the switch 68 through the OR gate 66, thereby powering the main control circuit 42 and other circuit units.

In response to the start of power supply, the main control circuit 42 connects the switch 31 to the contact b, sets the muting circuit 36 at the muting state, and shifts the signal 66a to the H-level. Then the sub-control circuit 46 sends an initialization command to the main control circuit 42 (step S1), and transmits the recording or reproducing mode according to the state of the mode setting switches 48, 50, 52. The initialization command is sent when the magnetic disk 10 is loaded anew, or when the power supply to the main control circuit 42 is interrupted for example by the replacement of the power supply unit 64 after the loading of the magnetic disk 10. The main control circuit 42 rotates the magnetic disk 10 by the servo circuit 16 and the motor 14, and moves the magnetic head 12 track by track toward the inside until the innermost track detection switch 22 is closed (steps S2, S3). Then the main control circuit 42 sets a track number "50" as a memory variable T in the RAM 44, initializes the track table with "0" as shown in FIG. 3, and connects the switch 31 to the contact a (step S4). FIG. 3 shows the track table in the RAM 44. The track table in the present embodiment has a capacity of 7 bytes with addresses a–g, in which 1 bit is assigned to each track. The same table is prepared as a back-up in the RAM 70.

The reproduction output of the magnetic head 12 is transmitted through the switch 31 and the reproducing amplifier 32, then subjected to envelope detection in the detection circuit 38, and compared with the reference voltage in the comparator circuit 40. The presence or absence of recorded signal can be identified in this manner. A recorded flag is set in a bit position of the track table corresponding to the track in the presence of the recorded signal, or is reset in the absence of the recorded signal (steps S5, S6 and S7). Then the main control circuit 42 sends the information on the recorded flag for the track T to the sub-control circuit 46, which stores the information in the track table of RAM 70 (step S8).

If the track T under access is not recorded (step S9), or if the track is recorded but the recording mode is not selected (step S10), the state of the tracks is checked track by track downwards (steps S12, S5–S10) until the 1st track is reached (step S11). On the other hand, if the track T is recorded and the recording mode is selected (step S9, S10), the magnetic head is shifted to the next track if the track T is not the 50th track, or remains in the track T if it is the 50th (steps S13, S14), and the main control circuit 42 sends an initialization completion command to the sub-control circuit 46 (step S15). Also in case the recording mode is selected (step S16), the main control circuit 42 shifts the signal 66a to the L-level thereby opening the switch 68 (step S17), but, in case the recording mode is not selected, it cancels the muting of the muting circuit 36.

As explained above, if the magnetic disk 10 is loaded in the recording mode, the recorded state of the tracks is investigated from the innermost track toward the outside, and the initialization is completed by positioning the magnetic head on an empty track immediately inside the recorded tracks. The initialization is completed on the 1st track if all the tracks are unrecorded, or on the 50th track if the innermost (50th) track is recorded.

On the other hand, if the magnetic disk is loaded in the reproducing mode, the recorded state is investigated in succession from the 50th track to the 1st track, and the initialization is completed on the 1st track.

After the initialization in the recording mode, the switch 68 is turned off to interrupt the power supply to the main control circuit 42 and other circuits, and the sub-control circuit 46 alone remains active. Consequently the track table in the RAM 44 and the track number T under access are erased, but the same set of data are stored in the RAM 70.

Figure 4:
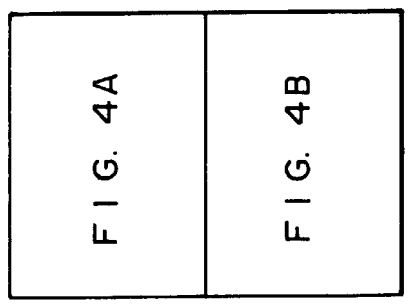
Figure 4A:
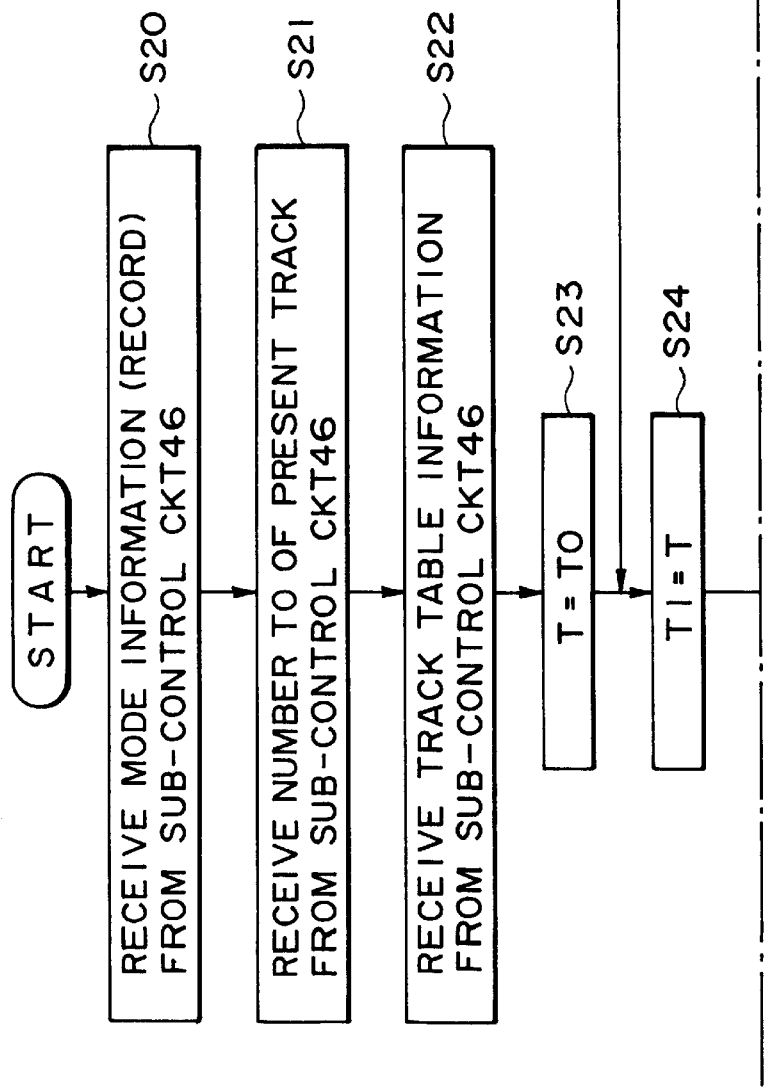

Now reference is made to FIG. 4 for explaining the operation when the recording preparation switch 62 is turned on in the recording mode in a state where the sub-control circuit 46 alone is active after the initialization. In response to the closing of the switch 62, the sub-control circuit 46 shifts the signal 66b to the H-level, thereby closing the switch 68 and supplying the main control circuit 42 with electric power. The main control circuit 42 shifts the signal 66a to the H-level to maintain the switch 68 on, thereby rotating the magnetic disk 10 and connecting the switch 31 to the contact b. The sub-control circuit 46 sends, to the main control circuit 42, mode information (indicating the recording mode in this state) (step S20), a current track number T0 (step S21) and track table information (step S22). The main control circuit 42 sets the current track number To, received from the sub-control circuit 46, as the memory variable T (step S23), and sets the variable T as a memory variable T1 (step S24).

The main control circuit 42 refers to the bit for the track T1 in the track table, and discriminates whether it is recorded ("1") (step S25). If the track is already recorded, the variable T1 is increased on the track table (step S27) until an unrecorded track is found (step S25) or the 50th track is reached (step S26). If the 50th track is reached before an empty track is found (step S26), the absence of empty track is informed to the sub-control circuit 46 (step S28), which in response shifts the signal 66a to the L-level, thereby turning off the switch 68 (step S35) and terminating the sequence.

If the track T1 is identified as unrecorded by the bit "0" on the track table (step S25), said track T1 identified as unrecorded is compared with the current track T (step S29), and, if they are not same, the variable T is increased to shift up the magnetic head 12 until they become equal (step S30). If T1 is equal to T (step S29), the state of the recording switch 60 is investigated (step S31). If it is on, the image pickup circuit 26 is activated, and the switch 31 is connected to the contact c to record the obtained field image signal on the magnetic disk 10 (step S33). The main control circuit 42 changes the corresponding bit of the track table to "1", and transmits the current track number T and information that the track has been recorded, to the sub-control circuit 46 (step S34). Thereafter the sequence returns to the step S24 and looks for an empty track in the routine of the steps S25–S27.

If the recording switch 60 is off (step S31) but the recording mode is selected (step S32), the sequence returns to the step S31 to await the closing of the recording switch 60 is closed. Also if the recording mode is not selected (step S32), the switch 68 is turned off (step S35) and the sequence is terminated.

Figure 5:
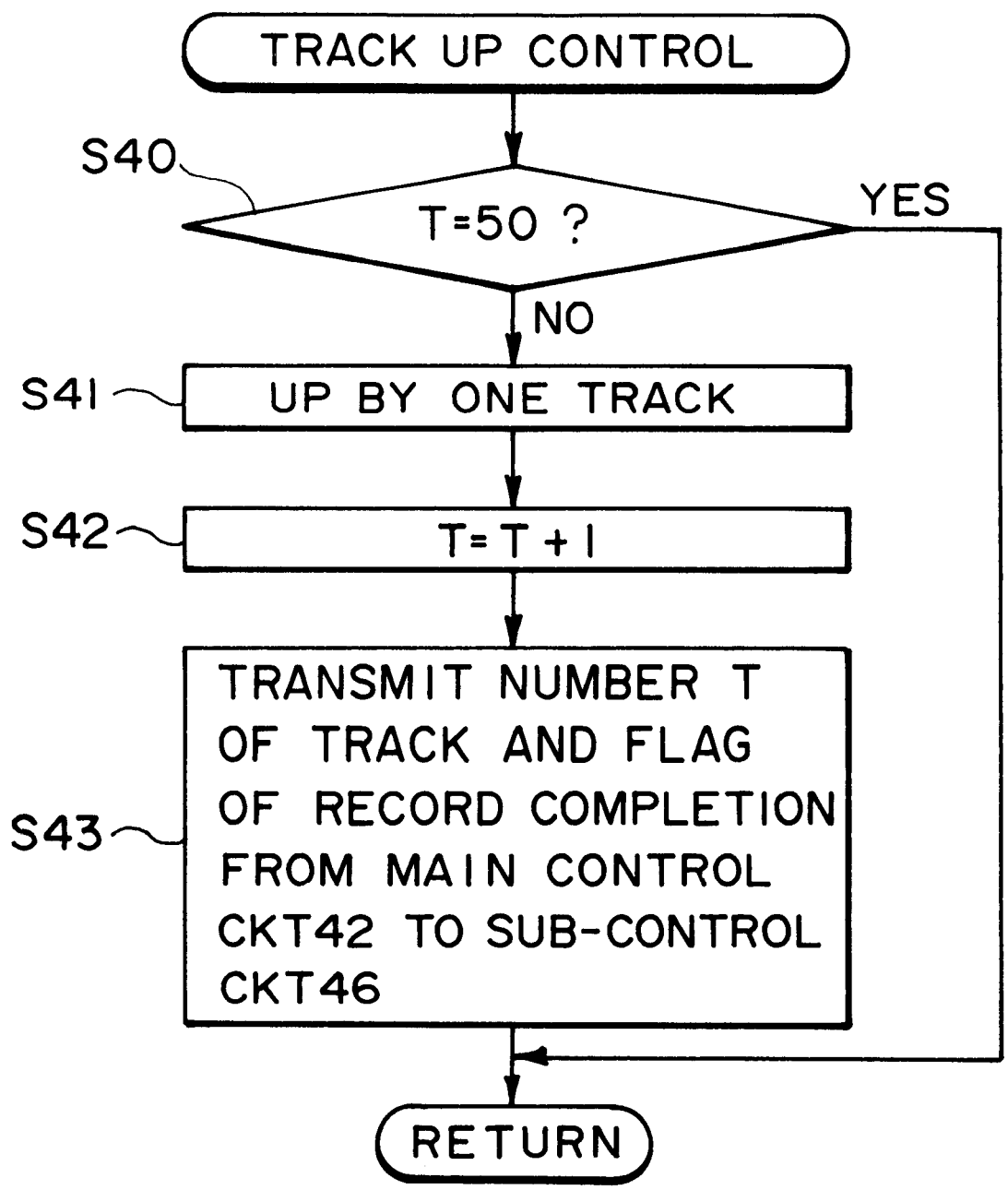
FIG. 5 is a flow chart of a trackup-shift control sequence.

FIG. 5 is a detailed flow chart of the track upshift control of step S30. If the current track is the innermost 50th track (step S40), the sequence returns to the main flow. If it is not the 50th track (step S40), the magnetic head 12 is shifted inwards by a track (step S41), and the variable T is increased by one (step S42). Then it is investigated, on the track table, whether the track T is already recorded, and this information and the value of variable T are transmitted to the sub-control circuit 46 (step S43).

The recording of an image signal is conducted as explained above, finding empty tracks up to the 50th track.

Figure 6B:
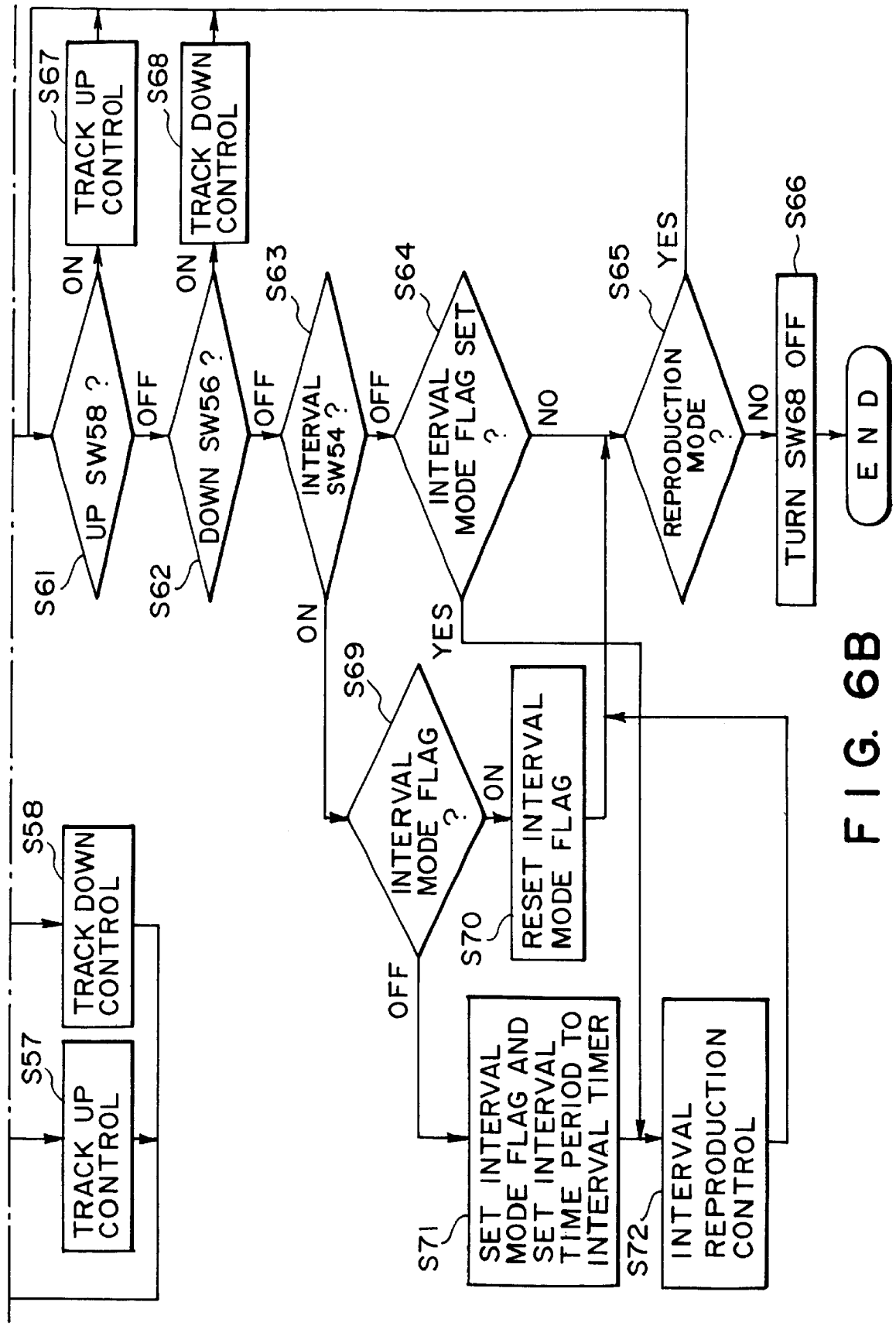

Now reference is made to FIG. 6 for explaining the function of the reproduction mode. The reproducing mode is selected by closing the reproduction mode switch 52 in a state in which the lock mode switch 52 or the recording mode switch 48 is on. The sub-control circuit 46 shifts the signal 66b to the H-level to close the switch 68, thereby supplying the main control circuit 42 with electric power. The main control circuit 42 also shifts the signal 66a to the H-level to maintain the switch 68 in the onstate, thereby rotating the magnetic disk 10, connecting the switch 31 to the contact b and setting the muting circuit 36 in the muting state. The sub-control circuit 46 sends, to the main control circuit 42, the mode information (indicating the reproducing mode) (step S50), current track number T0 (step S51), information on the track table (step S52) and destination track number T1 of the head (step S53). The main control circuit 42 sets the current track number T0, received from the sub-control circuit 46, as the memory variable T (step S54), then compares the current track number T with the destination track number T1 (step S55), and effects track upshift or downshift so as to reach a condition T=T1 (steps S56, S57, S58).

When the magnetic head 12 moves to the destination track T1, the reproducing operation is started (step S59). More specifically, the switch 31 is connected to the contact a, whereby the output of the magnetic head 12 is supplied through switch 31 and the reproducing amplifier 32 to the processing circuit 34, and subjected therein to a reproducing process such as demodulation to obtain the reproduced image signal. When the main control circuit 42 cancels the muting state of the muting circuit 36 (step S60), the reproduced image signal is released.

Thereafter the main control circuit 42 knows the states of the switches through communication with the sub-control circuit 46, and, during the reproducing mode (step S65), effects the corresponding operations. More specifically, the track upshift control is conducted in response to the actuation of the upshift switch 58 (steps S61, S67), and the track downshift control is conducted in response to the actuation of the downshift switch 50 (steps S62, S68). When the interval switch 54 is closed (step S63), there is investigated the state of an interval mode flag indicating whether the interval mode has been selected is investigation (step S69), and the flag is reset if it is on (step S70). If it is off, the flag is set, then an interval time, for example 5 seconds, is set in an interval timer 17 (step S71), and interval reproduction control is conducted (step S72). The content of the interval timer 17 is stepwise decreased every second to zero while the main control circuit 42 is powered. If the interval mode flag has been set (step S64), there is conducted the interval reproduction control (step S72).

When the reproduction mode switch 50 is turned off, the main control circuit 42 shifts the signal 66a to the L-level, thereby closing the switch 68 (step S66).

Figure 7:
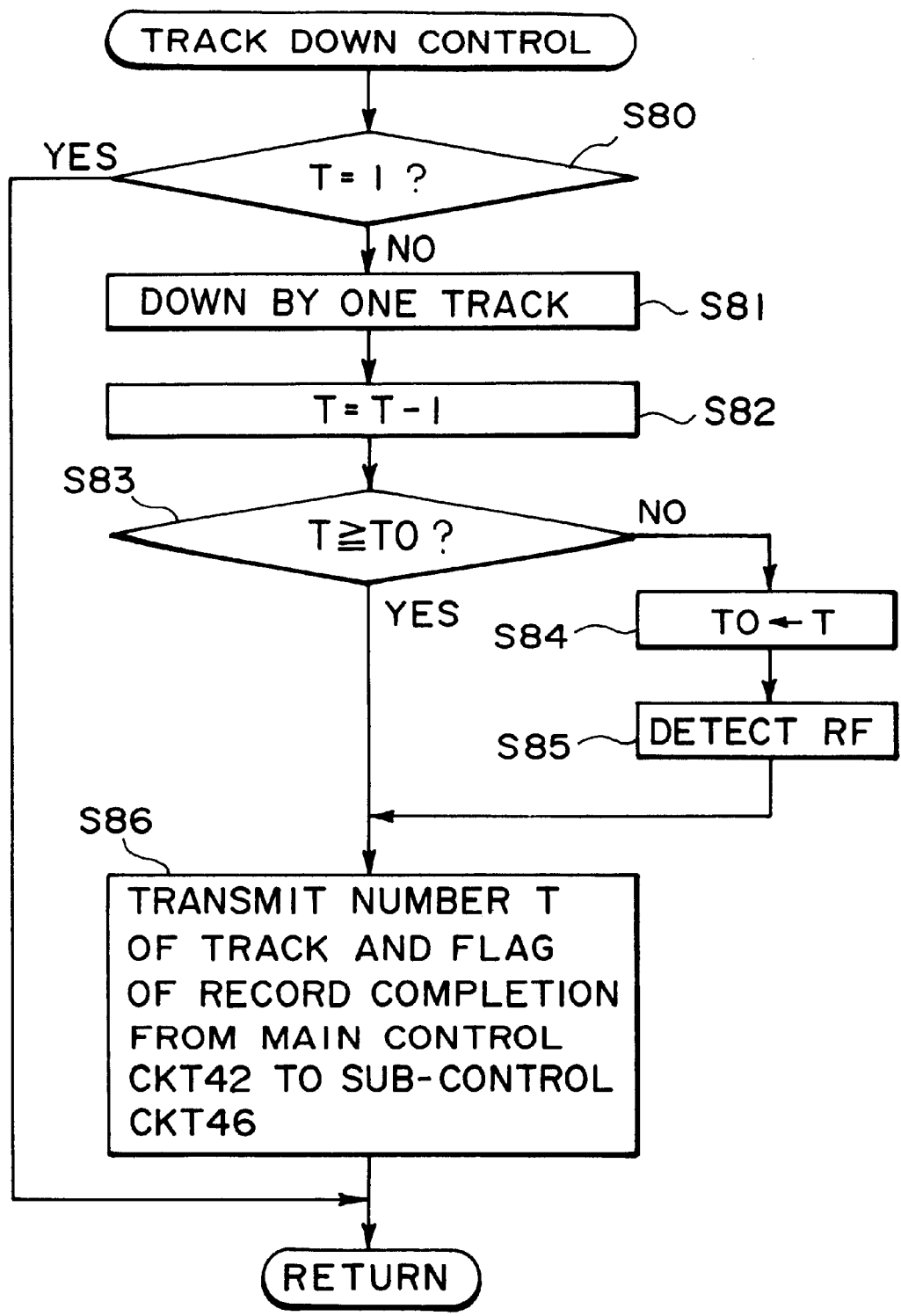
FIG. 7 is a flow chart of a track down-shift control sequence.

FIG. 7 is a detailed flow chart of the track downshift control of the step S58. If the current track T is the 1st track (step S80), the sequence returns to the main flow. If it is not the 1st track, the magnetic head 12 is moved to the outside by one track (step S81), and the variable T is decreased by one (step S82). Then there is discriminated whether the value T is equal to or larger than the value T0 received in the step S51 (step S83), and, if not, the value T is set as the variable T0 (step S84). Then the switch 31 is connected to the contact a and the RF signal is detected to discriminate whether the track is already recorded (step S85). Because of step S84, the variable T0 always indicates the minimum track number subjected to reproduction since the start of the reproducing operation.

If T is equal to or larger than T0 (step S83) or if the RF signal is detected (step S85), the track number and the information whether the track is already recorded are transmitted to the sub-control circuit 46 (step S86).

Figure 8A:
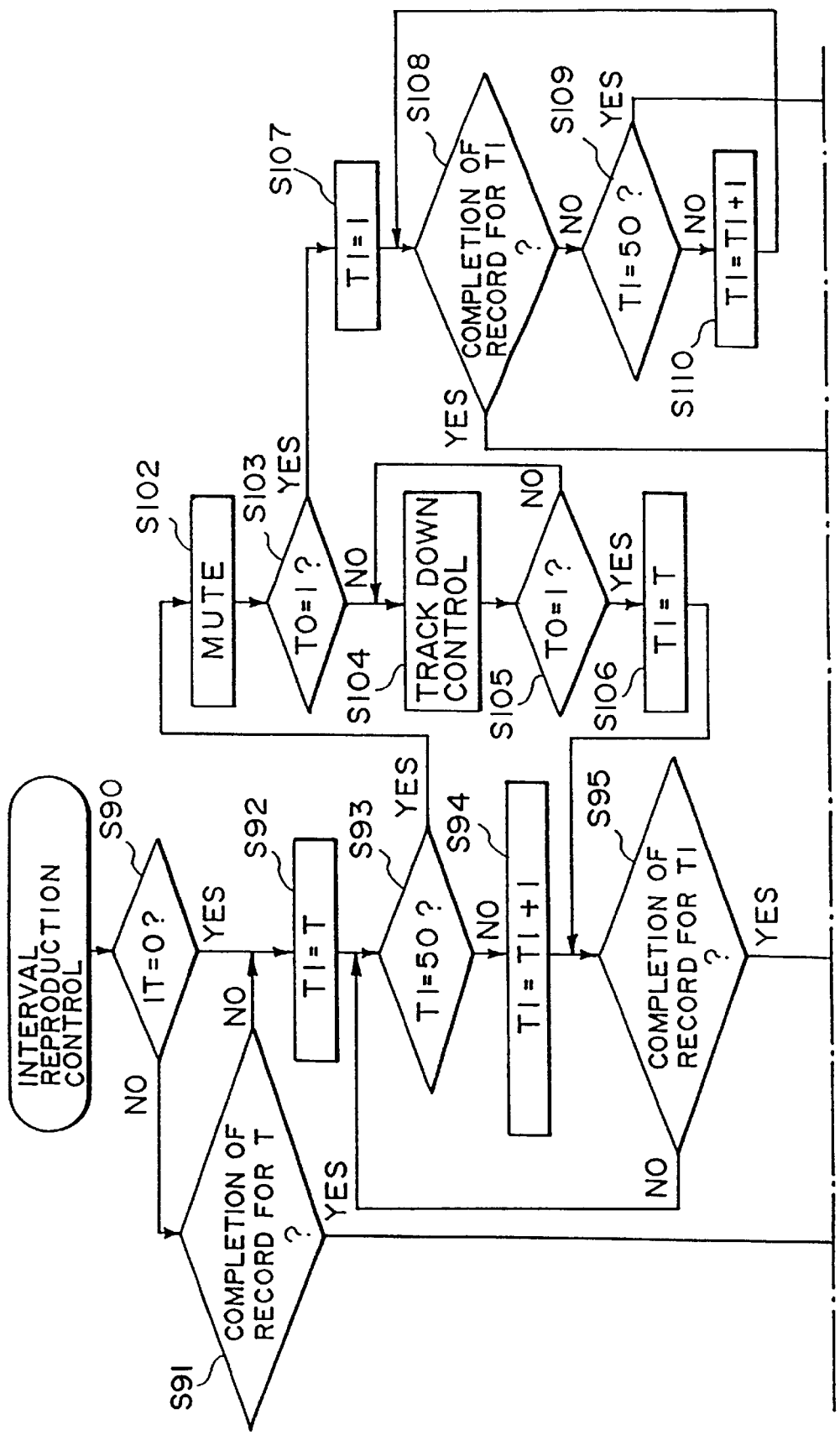
Figure 8:
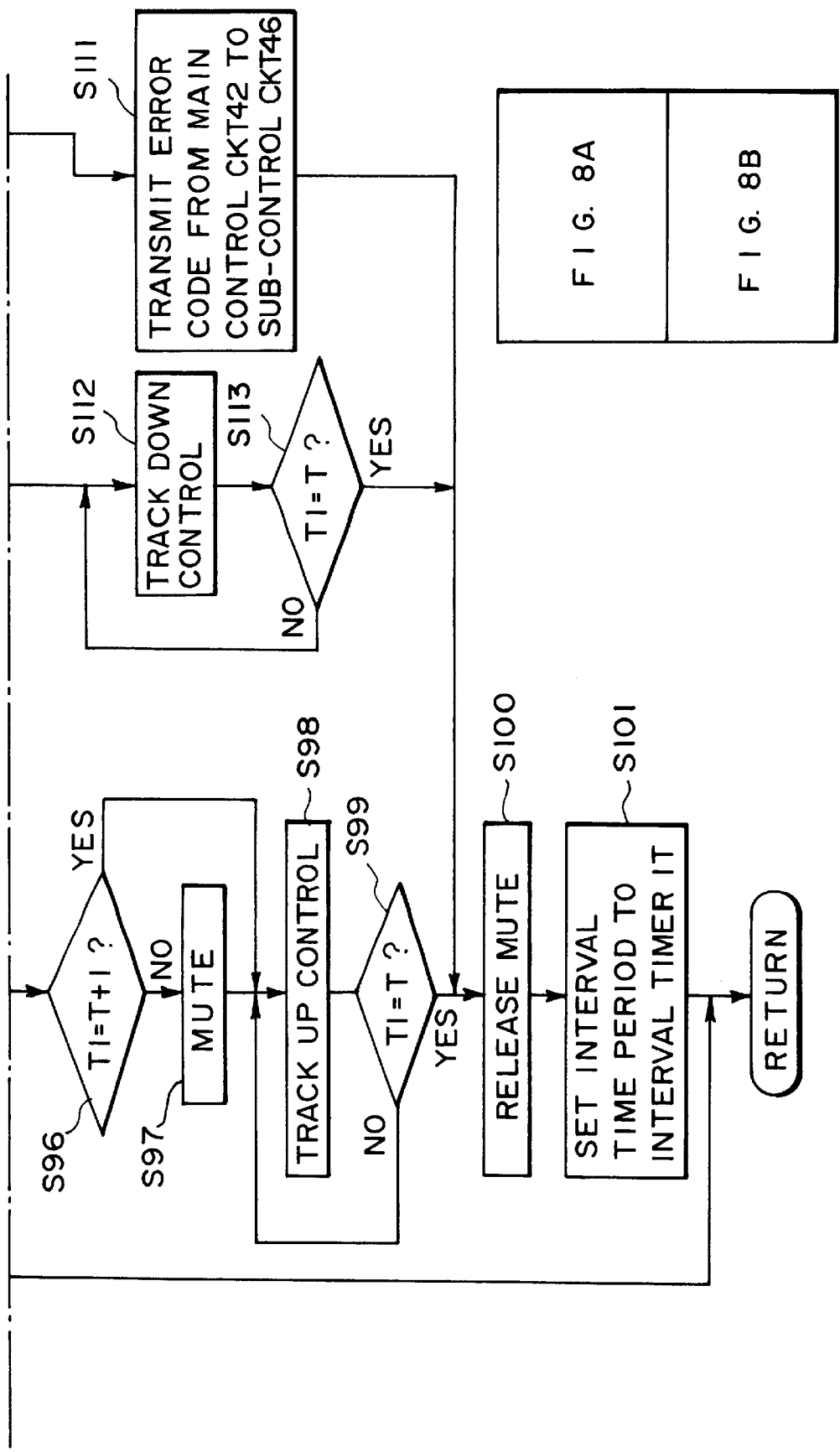

Now reference is made to FIG. 8 for explaining the detail of the interval reproduction control of the step S72 in FIG. 6. In the interval reproduction, the recorded tracks only are reproduced at a constant interval in the order of track numbers. After the reproduction of the innermost track, the magnetic head moves to the outermost recorded track to cyclically repeat the reproducing operation. At first there is discriminated whether the interval timer is "0" (step S90), and, if not, there is discriminated on the track table whether the track is already recorded (step S91). If the interval timer is "0" in step S90 or if the track is identified as unrecorded in the step S91, the current track number T is set as T1 (step S92), and a recorded track is searched for by a stepwise increment of T1 on the track table until the 50th track is reached (steps S94, S95). When a recorded track is found (step S96), there is discriminated whether the recorded track T1 is next to the current track T (step S96), and, if not, the muting is applied (step S97) and track upshift is conducted until T1=T is reached (steps S98, S99). Thereafter the muting state is cancelled (step S100), then the interval time of 5 seconds is set in the interval timer (step S101), and the sequence returns to the main flow. Also if the track is identified as recorded in the step S91, the sequence returns to the main flow.

As explained above, the recorded tracks are reproduced in succession at a predetermined interval from the current track toward the 50th track, by referring to the track table.

When the 50th track is reached by the increment of the value T1 (step S93), muting is applied (step S102) and there is discriminated whether the value T0 (minimum track number reproduced to this point) is "1" (step S103). A state T0=1 indicates that the content of the track table in the RAM 44 or 70 is all confirmed, wherein bits "0" indicate unrecorded tracks. On the other hand, if T0 is not "1", the bits "0" on the track table from the 1st track to a track immediately before T0 indicate that the confirmation of recorded/unrecorded state is not yet conducted.

If T0 is not "1" (step S103), track downshift is conducted until To becomes "1" (steps S104, S105), then the value T is set as T1 and the sequence proceeds to step S95. Thus all the contents of the track table are confirmed by the track downshift of step S104.

On the other hand, if T0 is "1" (step S103), a value "1" is set as the T1 (step S107), and there is discriminated whether the track T1 is already recorded (step S108). If it is not recorded, T1 is increased to "50" and there is discriminated whether the track is recorded (steps S109, S110). If it is recorded, track downshift is conducted until T1 becomes equal to T (steps S112, S113), and the sequence proceeds to step S100. Also if T1 reaches "50" without finding a recorded track (step S109), all the tracks are identified as unrecorded. The main control circuit 42 sends, to the sub-control circuit 46, an error code indicating that the interval reproduction is not possible (step S111), and the sequence proceeds to the step S100.

Thus, at the transfer from the innermost recorded track to the outermost recorded track in the interval reproduction mode, the reproduced minimum track number T0 is monitored, and, if it is not "1", track downshift is conducted to effect the RF signal detection on the unconfirmed tracks, thereby completing the track table.

The value T1 in step S53 in FIG. 6 may also be a track number which is recorded last in the recording mode. In this case an image recorded immediately before is automatically reproduced.

Figure 9B:
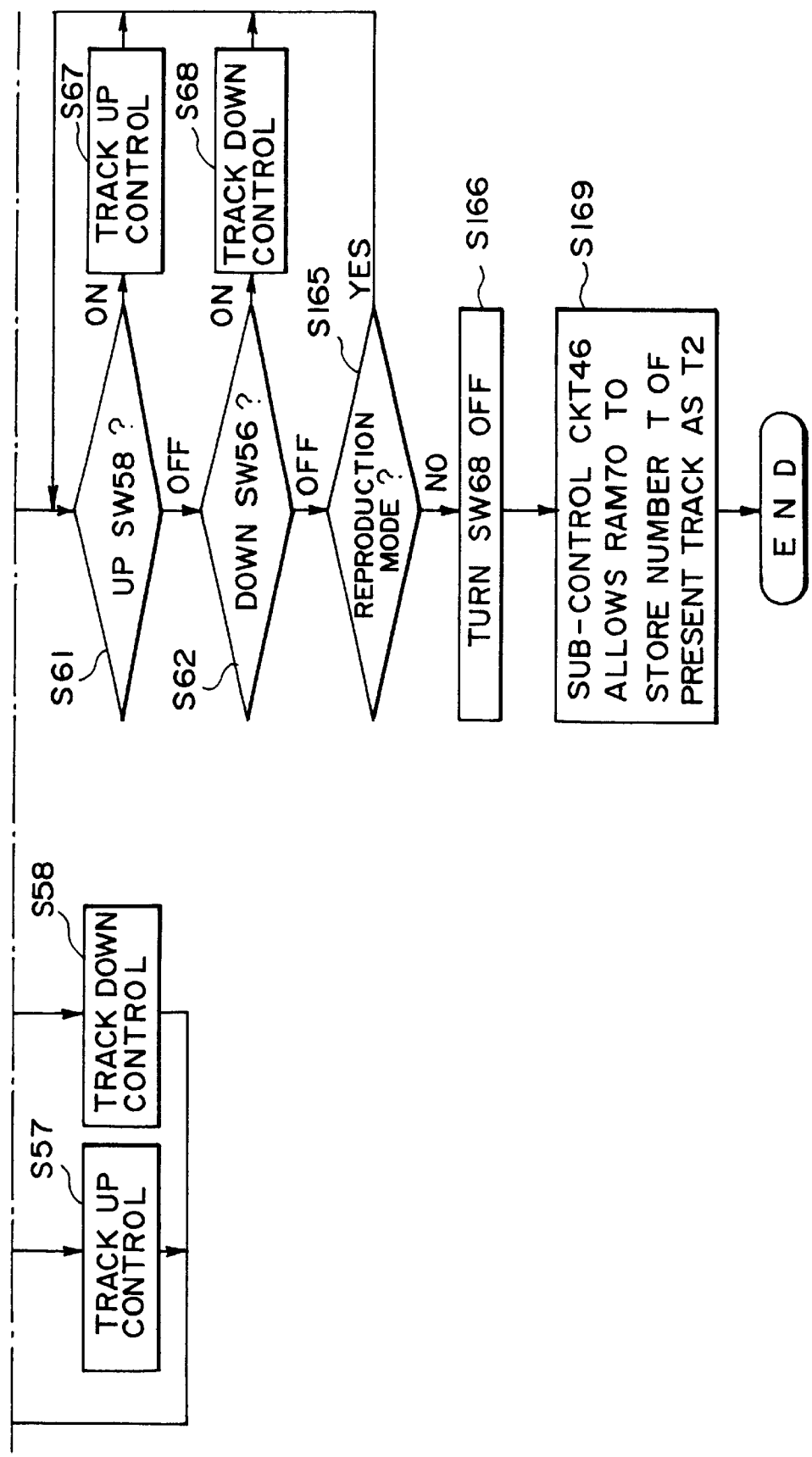

FIG. 9 shows a variation of the flow chart shown in FIG. 6. In FIG. 9, the same steps as those in FIG. 6 are represented by the same numbers, and the following description will be given only on different steps.

In FIG. 9, when the reproduction mode switch 50 is turned off in a state in which the switches 58 and 56 are both off (step S165), the main control circuit 42 shifts the signal 66a to the L-level thereby closing the switch 68 (step S166), while the sub-control circuit 46 stores the current track number T as a variable T2 in the RAM 70 (step S169). Thus, when the sequence proceeds to the step S166 in the reproducing mode, the variable T representing the current track number in the RAM 70 is same as T2.

In the recording mode, as shown in FIG. 4, the magnetic head is moved, after a recording operation, to an unrecorded track at the inside, and, even when there are certain recorded tracks at the inside, an unrecorded track is searched for, avoiding such recorded tracks. Consequently, when the operating mode is switched from recording to reproduction, the magnetic head is not positioned on the track recorded immediately before. In the present embodiment, the number of the track recorded immediately before is memorized as T2, and the magnetic head is moved to the track T2 by the steps S55–S58, thereby reproducing the image recorded immediately before, regardless of the presence of recorded tracks on the way of head movement.

The lock mode in the present embodiment retains the conditions of the immediately preceding recording or reproducing mode. Consequently a mode change from the recording mode through the lock mode to the reproduction mode is equivalent to a change from the recording mode to the reproduction mode.

In the variation shown in FIG. 9, at the switching from the reproduction mode to the recording mode, the sub-control circuit 46 may be so constructed as to set "1" as the variable T2 in the RAM 70. In this manner the magnetic head 12 makes access to the 1st track when the operating mode returns to reproduction without the recording operation.

In the embodiment shown in FIG. 6, when the operating mode is switched to reproduction, the track table is considered to be fixed for track numbers equal to or higher than a track T0 currently accessed by the magnetic head, and the RF signal detection is conducted in case of access to the track numbers smaller than T0. It is also possible, however, to compare the outermost (namely minimum) track number with track bit "1" with T0 by referring to the track table supplied from the sub-control circuit 46 immediately after step S54 shown in FIG. 6, to set the smaller number as T0 thereby assuming that the track table is confirmed for track number equal to or larger than T0, and to effect the RF signal detection in case of access to tracks of smaller track numbers.

The sub-control circuit 46 may also be so designed as to store, in the RAM 70, the minimum one of the track numbers transmitted from the main control circuit 42, to transmit the minimum number as T0 to the main control circuit 42 immediately after step S54, and to effect the RF signal detection only in case of access to a track number smaller than T0.

The recording medium in the foregoing embodiment has been limited to a magnetic disk, but the present invention is likewise applicable to other recording media such as a magnetic tape, an optical disk, a magneto-optical disk or a solid-state memory, for example, a semiconductor memory.

As will be apparent from the foregoing description, the above-explained embodiments allow information on the recorded/unrecorded state of the recording medium to be stored using a very limited memory capacity, and to efficiently execute the interval reproduction mode.

Also the foregoing embodiments allow an image recorded immediately before, to be reproduced when the operating mode is switched from recording to reproduction, regardless of the position of the recording area under access for recording, so that the confirmation of recorded image is facilitated.

What is claimed is:

1. A recording and reproducing apparatus which records an information signal on a recording medium and reproduces the information signal recorded on the recording medium, said apparatus comprising:

recording/reproducing means for recording the information signal on the recording medium and reproducing the information signal recorded on the recording medium;

memory means for storing information corresponding to the information signal recorded on said recording medium by said recording/reproducing means, in a state that an operation mode of said apparatus is a recording mode; and control means for controlling operations of said recording/reproducing means so as to reproduce, as a single image, the immediately previously recorded information signal recorded on the recording medium on the basis of the information stored in said memory means, in response to a shift of the operation mode of said apparatus from the recording mode to a reproducing mode.

2. An apparatus according to claim 1, further comprising:

operation mode setting means for setting the operation mode of said recording/reproducing means in one of the recording mode and the reproducing mode.

3. Apparatus according to claim 1, wherein the information stored in said memory means comprises track number information.

4. A recording and reproducing apparatus which records still image information on a recording medium and reproduces the still image information recorded on the recording medium, said apparatus comprising:

recording/reproducing means for recording the still image information on the recording medium and reproducing the still image information recorded on the recording medium;

memory means for storing information corresponding to the still image information recorded on said recording medium by said recording/reproducing means, in a state that an operation mode of said apparatus is a recording mode; and control means for controlling operations of said recording/reproducing means so as to reproduce, as a single image, the immediately previously recorded still image information recorded on the recording medium on the basis of said information stored in said memory means, in response to a shift of the operation mode of said apparatus from the recording mode to a reproducing mode.

5. An apparatus according to claim 4, further comprising:

operation mode setting means for setting the operation mode of said recording/reproducing means in one of the recording mode and the reproducing mode.

6. Apparatus according to claim 4, wherein the information stored in said memory means comprises track number information.

* * * * *

UNITED STATES PATENT AND TRADEMARK OFFICE
CERTIFICATE OF CORRECTION

PATENT NO.    : 6,272,282 B1
DATED         : August 7, 2001
INVENTOR(S)   : Shigeo Yamagata et al.

It is certified that error appears in the above-identified patent and that said Letters Patent is hereby corrected as shown below:

<u>Title page,</u>
Item [56] References Cited

FOREIGN PATENT DOCUMENTS
    "01256877
    "01256878" should read -- 1-256877
                               1-256878 --.
    "2087100" should read -- 2087102 --.

<u>Column 2,</u>
Line 55, "a" should be deleted; and
Line 60, "trackup-shift" should read -- track up-shift --.

<u>Column 5,</u>
Line 24, "are" should read -- is --; and
Line 40, "To," should read -- T0, --.

<u>Column 6,</u>
Line 7, "60 is closed." should read -- 60. --.

<u>Column 7,</u>
Line 66, "To" should read -- T0 --.

Signed and Sealed this

Fourteenth Day of May, 2002

Attest:

JAMES E. ROGAN
*Attesting Officer*      *Director of the United States Patent and Trademark Office*